Figure 1:
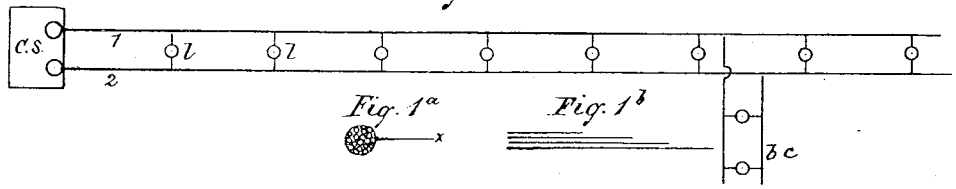

(No Model.)  T. A. EDISON.  3 Sheets—Sheet 1.

ELECTRIC DISTRIBUTION AND TRANSLATION SYSTEM.

No. 264,642.  Patented Sept. 19, 1882.

Witnesses:  
F. W. Howard  
James A. Payne

Inventor:  
T. A. Edison  
per Dyer & Wilber  
Attorneys.

(No Model.) 3 Sheets—Sheet 2.

T. A. EDISON.
ELECTRIC DISTRIBUTION AND TRANSLATION SYSTEM.

No. 264,642. Patented Sept. 19, 1882.

Witnesses:
F. W. Howard
James A. Payne.

Inventor:
T. A. Edison
per Dyer & Wilber
Attorneys.

(No Model.) 3 Sheets—Sheet 3.

T. A. EDISON.
ELECTRIC DISTRIBUTION AND TRANSLATION SYSTEM.

No. 264,642. Patented Sept. 19, 1882.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

ELECTRIC DISTRIBUTION AND TRANSLATION SYSTEM.

SPECIFICATION forming part of Letters Patent No. 264,642, dated September 19, 1882.

Application filed August 9, 1880. (No model.) Patented in England September 24, 1880, No. 3,880; in Canada November 15, 1880, No. 11,997; in Italy November 19, 1880; in Belgium November 30, 1880, No. 53,018; in France January 3, 1881, No. 139,588; in Victoria January 4, 1881, No. 2,944; in Austria February 3, 1881; in New South Wales March 7, 1881; in New Zealand March 7, 1881, No. 512; in Queensland March 9, 1881; in Spain April 2, 1881, and in India July 20, 1881, No. 528.

*To all whom it may concern:*

Be it known that I, THOMAS A. EDISON, of Menlo Park, in the county of Middlesex and State of New Jersey, have invented a new and useful Electric Distribution and Translation System, (Case No. 236;) and I do hereby declare that the following is a full and exact description of the same, reference being had to the accompanying drawings, and to the letters of reference marked thereon.

This invention relates to a method of equalizing the tension or "pressure" of the current through an entire system of electric-lighting or other translation of electric force, preventing what is ordinarily known as a "drop" in those portions of the system the more remote from the central station, and also to other features in systems for the utilization of electricity, as hereinafter explained.

As is well known from patents already granted me and prior applications pending, I use in my system an electric light formed of a continuous incandescing conductor, large numbers of which are grouped into one system, supplied and regulated from a central station, main conductors leading from and to the central station, each lamp or translating device being in a derived circuit to the main conductors, the entire system being what is known as a "multiple-arc" system. From a central station the main conductors may proceed, and it is intended that they should, to a great distance and supply a large number of translating devices. In such cases there is inevitably a difference in tension between various parts of the circuit, due to the resistance of the main conductors. This may be partially remedied by making the conductors very large near or at the station, gradually decreasing their size or conducting capacity; but such plan only lessens slightly the ratio of fall. To obviate the difficulty I provide feeding-conductors, which extend from the generator or generators to the main conductors of the lamp or consumption circuit or circuits, such feeding-conductors not having any translating devices connected therewith, and being connected with the main conductors of the consumption circuit or circuits at the center, ends, or other points on such main conductors. From a central station several sets of such feeding-conductors may run, each set feeding into its own lamp or consumption-circuit or all the sets feeding into a connected system of lamp or consumption circuits. It will be seen that the drop upon the feeding-conductors has no effect upon the relative candle-power of the lamps of the system, the relative candle-power of the lamps being affected only by the drop upon the main conductors of the consumption circuit or circuits between the end of a set of feeding-conductors and points most distant from any feeding-conductors. In order to maintain practically the same candle-power throughout the system, the main conductors of the consumption circuit or circuits should be so proportioned that the drop in tension upon them shall not exceed a definite small limit—for example, five per cent. This drop will make a difference of less than a candle-power in all the sixteen-candle-power lamps of the system, which difference is not perceptible to the eye. Upon the feeding-conductors, however, any loss can be made. This loss will be varied according to localities and the relative cost of copper for conducting purposes and horse-power for generation. This loss upon the feeding-conductors in large and extended systems will generally be greater than upon the main conductors of the consumption circuit or circuits. It may be, for example, about fifteen per cent.; but circumstances might make it desirable to diminish the loss upon the feeding-conductors down even as low as that upon the main conductors of the consumption circuit or circuits, or to increase the loss upon the feeders to more than fifteen per cent.

In this connection I wish to state that I am aware of the French patent of Khotinsky, No. 107,307, granted March 19, 1875.

When it is desired to use a few lamps near the central station they may be placed upon a direct circuit therefrom, with resistance at the commencement or home end of the circuit sufficient to then reduce the tension of the current in such circuit so that it shall only be equal to that in the more distant circuits, and one or more of such circuits may be combined with the circuits before described. When large buildings or blocks of buildings using many lamps are to be supplied, it may be desirable to lay therefor separate feeders insulated from each other.

Where several central stations are used in a city, each having feeding-conductors leading to lamp-circuit conductors of the description before noted, it may be advisable to connect the feeding-circuits of all the stations, equalizing the tension or pressure throughout the entire system of the place where the central stations are located.

In the drawings are given diagrammatic representations of circuits, which will be more fully hereinafter described.

Figure 1 illustrates a plan wherein the conductors are made larger at their home ends, gradually tapering to the outer end of the system. Where such plan is used it is preferable to make the conductor a compound one, composed of several single wires of different lengths, one or two of which extend the whole length of the conductor, others ending at various points, as shown in Fig. 1ᵇ. These wires are not insulated, but merely grouped in a bunch, which have transverse fastenings at intervals, or which may be fastened together by branch conductors passing around where connections are formed, as shown in Fig. 1ᵃ. It is preferable to form all conductors which vary in size, decreasing from some point in this manner, and it is to be understood in subsequent descriptions that all such conductors are so made.

Figure 2:
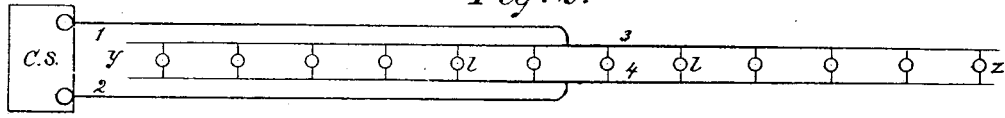

In Fig. 2 feeding-conductors 1 2 lead from central station C S, connecting with the lamp-circuit 3 4 at about its center, the conductors of the lamp-circuit being largest at that point, and also of slightly larger capacity at that point than the feeding-conductors. By this arrangement most of the fall of pressure or drop in tension takes place in the feeding-circuit, so that it cannot affect any lamps, while the drop in the lamp-circuit is reduced very low, as before explained, the drop from the center of the lamp-circuit to either terminal being only about one-fourth what the drop would be from y to z if either end were connected directly to the central station. Any desired number of lamp-circuits may be so arranged, each having its proper feeding-conductors, two so arranged being shown in Fig. 3.

Figure 3:
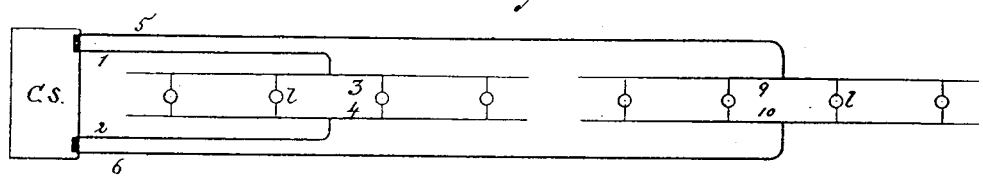
Figure 4:
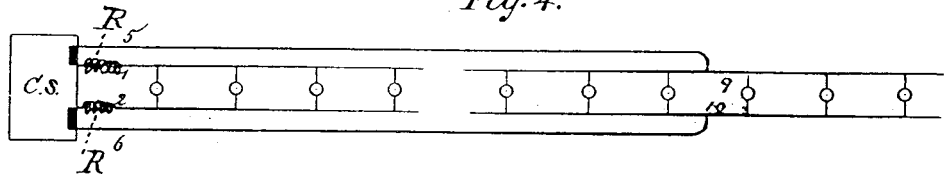
Figure 5:
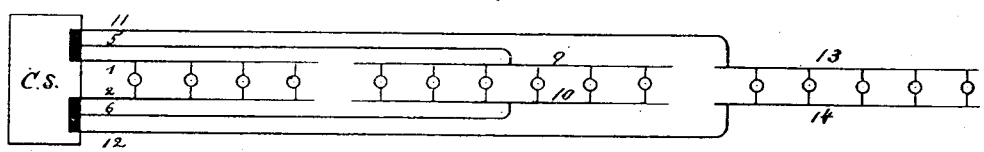

In some instances where it is desired to use a few lamps near the station they may be placed directly upon main conductors, and combined with the circuits shown in Figs. 2 and 3, as shown in Fig. 4, where feeders 5 6 connect with lamp-circuit 9 10, arranged as in Figs. 2 and 3, while circuit 1 2, connected directly to C S, has a few lamps upon it, in which case resistances R R should be used therein to lessen the tension of the current in 1 2 to the same extent as it is lessened by the larger conductors 5 6. With such arrangement may also be combined an ordinary terminal circuit containing a few lamps, such as the circuit 13 14 in Fig. 5.

Figure 6:
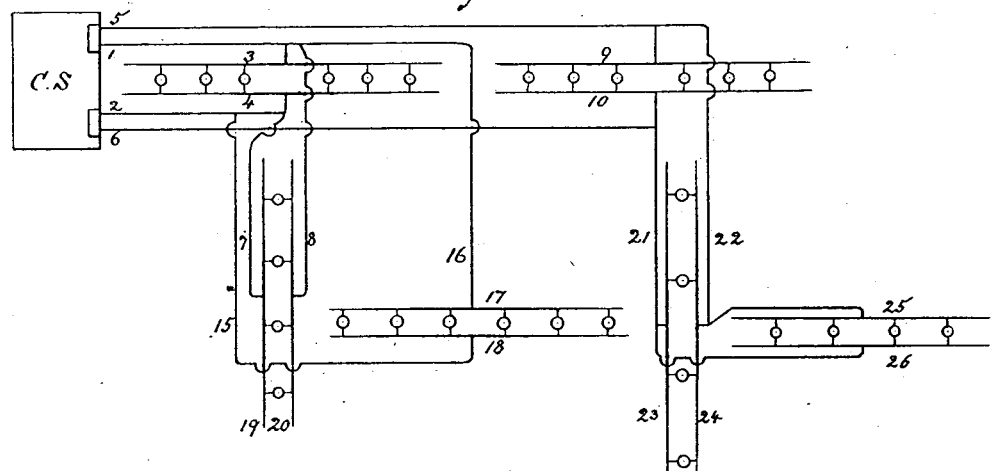

In Fig. 6 is shown direct or main feeding circuits 1 2 and 5 6 with lamp-circuits 3 4 and 9 10 with branch feeders 7 8, 15 16, and 21 22 leading into side streets, supplying lamp-circuits 17 18, 19 20, 23 24, and 25 26, the branch feeders being derived circuits from the main feeders, all constituting a multiple-arc system.

Figure 7:
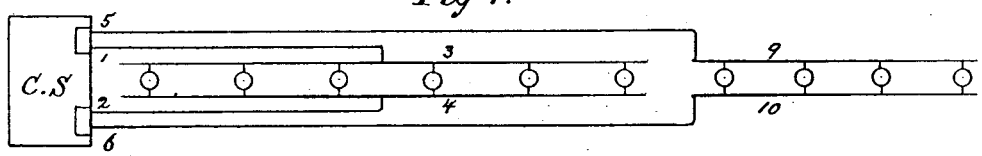

In Fig. 7 feeding-mains 1 2 connect to the center of the lamp-circuit 3 4, while feeders 5 6, leading to a greater distance and to a circuit when comparatively few lamps are required, connects to the end of lamp-circuit 9 10, whose conductors gradually taper from the point of connection. This arrangement is sometimes desirable in sparsely-settled localities, as involving economy in the laying of conductors.

Figure 8:
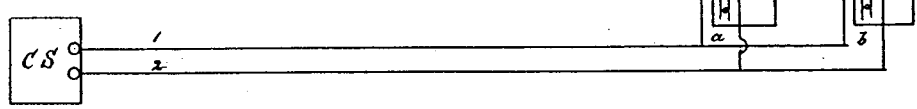

In Fig. 8 is shown feeding-conductors 1 2, from which lead house-feeders $a\ b$, which connect to lamp-circuits $a'\ b'$, which are of same description as circuit 3 4, Fig. 2.

Figure 9:
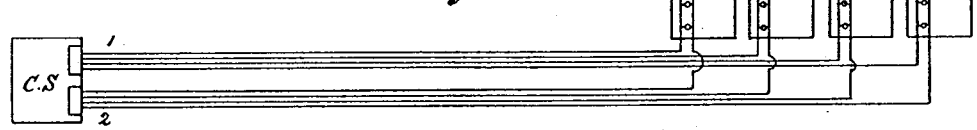

Fig. 9 shows a series of houses or buildings, $c\ d\ e\ f$, to each of which leads a feeding-circuit of insulated conductor, the lamp-circuit of each house being thereby put in direct connection with the central station C S, the tension of the current in any one lamp-circuit not being affected by the others.

Figure 10:
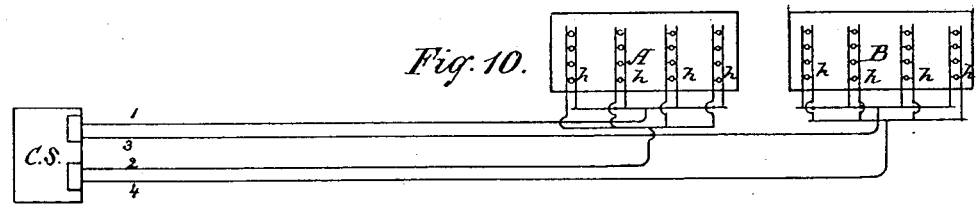

In Fig. 10 are two blocks of buildings, A and B, composed each of several houses, $h\ h\ h$, separate feeding-circuits 1 2 and 3 4 leading to branch feeding-circuits, from which lamp-circuits lead into each house, each house or lamp-circuit being provided with its own connection and meter.

In the arrangements shown in Figs. 8, 9, and 10 the greatest portion of the fall or drop occurs in the conductors leading to the house or block lamp-circuits, the tension or pressure in the branches leading into the houses being maintained practically uniform thereby in each lamp-circuit.

Figure 11:
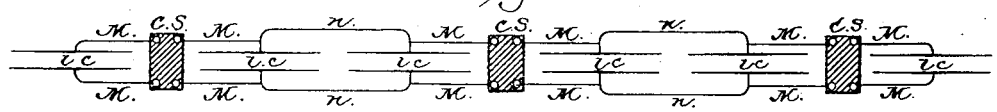

Fig. 11 shows a series of central stations, C S, from each of which lead main feeding-circuits M, which may be of any desired number, each connecting to and feeding into a lamp-circuit, $l\ c$. The mains of all the stations are connected by conductors $n\ n\ n$, so that all the stations are electrically connected into one general system, whereby the pressure throughout the entire system is equalized.

Figure 12:
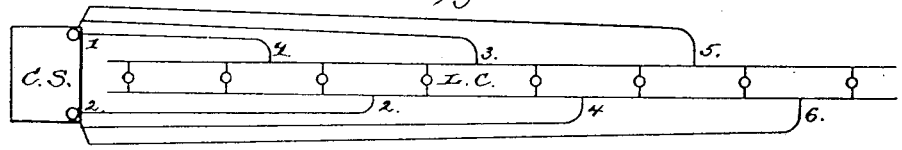

In Fig. 12 the lamp-circuit L C is fed by a number of feeding-circuits, connecting thereto on opposite sides, alternately 1 2, 3 4, and 5 6, forming three feeding-circuits, by which arrangement a comparatively uniform force or pressure may be maintained throughout the entire system.

I do not claim broadly a conductor tapering from the source of energy, as such, *per se*, is old; but I do claim, as hereinafter set forth, my particular way of forming such a conductor.

What I claim is—

1. A consumption-circuit, in the main conductors of which the drop in tension is not sufficient to vary practically the candle-power of the lamps connected therewith, in combination with feeding-conductors connecting the consumption-circuit with the source of electrical energy, and having no translating devices connected therewith, the drop in tension upon such feeding-conductors not affecting the relative candle-power of the lamps of the consumption-circuit, substantially as set forth.

2. A consumption-circuit in the main conductors of which there is a definite small drop in tension not sufficient to vary practically the candle-power of the lamps connected therewith, in combination with feeding-conductors connecting the consumption-circuit with the source of electrical energy, and having no translating devices connected therewith, the loss upon such feeding-conductors being greater than upon the main conductors of the consumption-circuit, substantially as set forth.

3. The combination of a consumption-circuit, in the main conductors of which the drop in tension is not sufficient to vary practically the candle-power of the lamps connected therewith, with a feeding-circuit having no translating devices, and extending from the source of electrical energy to the center of the consumption-circuit, substantially as set forth.

4. The combination of two or more central stations having feeding-conductors, and consumption-circuits supplied by such feeding-conductors, as described, of connections between the conductors of the central stations, substantially as and for the purposes set forth.

5. The combination, in one system, of a main circuit connected directly to a source of energy, and containing translating devices, and provided with resistances for lessening the tension or pressure of the current to that of the average of the system, a circuit not directly connected to the source of energy containing translating devices, and a feeding-circuit connecting the latter circuit with the source of energy, substantially as set forth.

6. The combination of a number of uninsulated wires of different lengths grouped together and fastened at intervals, forming a gradually-tapering conductor, substantially as set forth.

This specification signed and witnessed this 4th day of August, 1880.

THOS. A. EDISON.

Witnesses:
WM. CARMAN,
OTTO A. MOSES.